(12) United States Patent
Wang et al.

(10) Patent No.: US 12,225,144 B2
(45) Date of Patent: Feb. 11, 2025

(54) ELECTRONIC DEVICE

(71) Applicant: Honor Device Co., Ltd., Shenzhen (CN)

(72) Inventors: Zhize Wang, Shenzhen (CN); Peng Wang, Shenzhen (CN); Kunpeng Zhu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 180 days.

(21) Appl. No.: 18/022,373

(22) PCT Filed: Jan. 29, 2022

(86) PCT No.: PCT/CN2022/074996
§ 371 (c)(1),
(2) Date: Feb. 21, 2023

(87) PCT Pub. No.: WO2022/213715
PCT Pub. Date: Oct. 13, 2022

(65) Prior Publication Data
US 2023/0319171 A1    Oct. 5, 2023

(30) Foreign Application Priority Data
Apr. 8, 2021  (CN) .......................... 202110379755.7

(51) Int. Cl.
*G06F 1/16* (2006.01)
*H04M 1/02* (2006.01)

(52) U.S. Cl.
CPC ....... *H04M 1/0214* (2013.01); *H04M 1/0262* (2013.01); *G06F 1/1635* (2013.01);
(Continued)

(58) Field of Classification Search
CPC .... G06F 1/1635; G06F 1/1637; G06F 1/1641; G06F 1/1652; G06F 1/1656; H05K 5/00; H05K 5/0017; H05K 5/0217; H05K 7/18
See application file for complete search history.

(56) References Cited

U.S. PATENT DOCUMENTS

| | | | | |
|---|---|---|---|---|
| 5,438,482 A | * | 8/1995 | Nakamura | H05K 7/1417 174/371 |
| 2020/0022267 A1 | | 1/2020 | Han et al. | |

(Continued)

FOREIGN PATENT DOCUMENTS

| | | |
|---|---|---|
| CN | 204376971 U | 6/2015 |
| CN | 208820830 U | 5/2019 |

(Continued)

*Primary Examiner* — Abhishek M Rathod
(74) *Attorney, Agent, or Firm* — Leydig, Voit & Mayer, Ltd.

(57) ABSTRACT

An electronic device includes a display module, a middle frame, and a battery cover. The display module and the battery cover are respectively located at two sides of the middle frame. The display module includes at least a display layer and a mounting bracket, the mounting bracket comprises a first surface and a second surface, the first surface faces the display layer, and the second surface faces the middle frame. A conductive plating layer is arranged on a partial region of the second surface of the mounting bracket, and a conductive transition layer is arranged at an outer periphery of the conductive plating layer. The conductive plating layer is electrically connected to the middle frame.

19 Claims, 11 Drawing Sheets

(52) U.S. Cl.
CPC .......... *G06F 1/1641* (2013.01); *G06F 1/1652* (2013.01); *G06F 1/1656* (2013.01); *H04M 1/0268* (2013.01)

(56) References Cited

U.S. PATENT DOCUMENTS

| | | |
|---|---|---|
| 2020/0043383 A1 | 2/2020 | Yang |
| 2020/0163231 A1 | 5/2020 | Park |
| 2022/0159112 A1* | 5/2022 | Kim .................... H05K 1/0239 |

FOREIGN PATENT DOCUMENTS

| | | |
|---|---|---|
| CN | 110796953 A | 2/2020 |
| CN | 111782078 A | 10/2020 |
| CN | 212302932 U | 1/2021 |
| CN | 212516364 U | 2/2021 |
| CN | 113286456 A | 8/2021 |
| CN | 215417305 U | 1/2022 |
| EP | 3654138 A1 | 5/2020 |
| KR | 101659476 B1 | 9/2016 |

\* cited by examiner

ELECTRONIC DEVICE

CROSS-REFERENCE TO RELATED APPLICATIONS

This application is a national stage of International Application No. PCT/CN2022/074996, filed on Jan. 29, 2022, which claims priority to Chinese Patent Application No. 202110379755.7, filed on Apr. 8, 2021. The disclosures of both of the aforementioned applications are hereby incorporated by reference in their entireties.

TECHNICAL FIELD

Embodiments of this application relate to the field of display technologies, and in particular, to an electronic device.

BACKGROUND

With the continuous development of display module technology of mobile terminal devices such as a mobile phone, development of a light and thin display module has become a development trend of the display module technology. However, with the development of the light and thin display module, requirements for a display module are getting higher and higher.

Currently, a mobile phone mainly includes a display module, a middle frame, and a battery cover. The display module and the battery cover are respectively arranged on two sides of the middle frame. The display module mainly includes a cover, a display layer, and a mounting bracket. The display layer is located between the cover and the mounting bracket, and the mounting bracket is often made of metal materials to improve supporting performance and impact resistance of a back surface thereof. To reduce a risk of signal interference and electro-static discharge (ESD), the display module is often electrically connected to the middle frame through the mounting bracket to achieve grounding.

However, to increase electrical conductivity between the mounting bracket and the middle frame, it is usually necessary to plate conductive materials on a side of the mounting bracket facing away from the display layer to improve the conductivity. However, after plating the conductive materials on the mounting bracket, a side of the mounting bracket facing the display layer and a position corresponding to the conductive materials are deformed, resulting in uneven reflected light on a deformed region under light exposure after a screen of the mobile phone is off, and observable impressions on appearance of the mobile phone, which affects the appearance of the mobile phone.

SUMMARY

Embodiments of this application provide an electronic device, which improves flatness of a back surface of an electroplating position of a mounting bracket in the electronic device, reduces or avoids uneven light in an electroplating region after a screen of the electronic device is off, and ensures that an impression degree of the electroplating region is reduced or there is no impression when the electronic device is exposed to light.

According to a first aspect of the embodiments of this application, an electronic device is provided. The electronic device includes: a display module, a middle frame, and a battery cover, where the display module and the battery cover are respectively located at two sides of the middle frame;
  the display module includes at least a display layer and a mounting bracket, the mounting bracket includes a first surface and a second surface, the first surface faces the display layer, and the second surface faces the middle frame;
  a conductive plating layer is arranged on a partial region of the second surface of the mounting bracket, and a conductive transition layer is arranged at an outer periphery of the conductive plating layer; and
  the conductive plating layer is electrically connected to the middle frame.

The conductive transition layer is added at the periphery of the conductive plating layer, or an outer edge of the conductive plating layer is set to be in an uneven serrated shape, so that a material internal stress generated by a metal plating layer arranged on the mounting bracket gradually reduces from the conductive plating layer to the conductive transition layer. In this way, an arch generated on the first surface of the mounting bracket is gradually reduced to a large flat region, to reduce the impression degree.

In a possible implementation, the conductive transition layer includes a plurality of first sub-transition layers, and the plurality of first sub-transition layers are spaced apart around the outer periphery of the conductive plating layer for one or more turns; and
  an area of each of the first sub-transition layers is smaller than an area of the conductive plating layer.

In a possible implementation, the plurality of first sub-transition layers and an outer edge of the conductive plating layer are spaced apart.

In a possible implementation, the conductive transition layer further includes a plurality of second sub-transition layers; and
  the plurality of second sub-transition layers are located at an outer periphery of the plurality of first sub-transition layers.

In a possible implementation, an area of the second sub-transition layer is smaller than an area of the first sub-transition layer.

In a possible implementation, each of the second sub-transition layers is located on a centerline between two adjacent first sub-transition layers.

In a possible implementation, shapes of the first sub-transition layer and the second sub-transition layer are any one of a circle, a polygon, or an ellipse.

In a possible implementation, the plurality of first sub-transition layers are spaced apart along the outer periphery of the conductive plating layer on the outer edge of the conductive plating layer; and
  two adjacent first transition layers and a part of the outer edge of the conductive plating layer form a notch, so that the outer edge of the conductive plating layer is serrated.

In a possible implementation, a shape of the first sub-transition layer is a semicircle or a polygon.

According to a second aspect of the embodiments of this application, an electronic device is provided. The electronic device includes: a display module, a middle frame, and a battery cover, where the display module and the battery cover are respectively located at two sides of the middle frame;
  the display module includes at least a display layer and a mounting bracket, the mounting bracket includes a first surface and a second surface, the first surface faces the display layer, and the second surface faces the middle frame;

a conductive plating layer is arranged on a partial region of the second surface of the mounting bracket, a plurality of openings are provided on the conductive plating layer, and hole bottoms of the openings extend to the second surface; and the conductive plating layer is electrically connected to the middle frame.

A hole is dug on the conductive plating layer, so that an internal stress generated on the conductive plating layer is released at the opening, a material internal stress generated by a metal plating layer arranged on the mounting bracket is reduced, and an arch generated on the first surface of the mounting bracket is reduced to a large flat region, to reduce the impression degree.

In a possible implementation, the plurality of openings are spaced apart around a center of the conductive plating layer for one or more turns.

In a possible implementation, the opening is a round hole, a square hole, or an elliptical hole.

According to a third aspect of the embodiments of this application, an electronic device is provided. The electronic device includes: a display module, a middle frame, and a battery cover, where the display module and the battery cover are respectively located at two sides of the middle frame;

the display module includes at least a display layer and a mounting bracket, the mounting bracket includes a first surface and a second surface, the first surface faces the display layer, and the second surface faces the middle frame;

a recessed region is provided on the first surface of the mounting bracket, and a conductive plating layer is arranged at a position opposite to the recessed region on the second surface of the mounting bracket; and the conductive plating layer is electrically connected to the middle frame.

A region opposite to the conductive plating layer on the first surface of the mounting bracket is thinned to form a recessed region, and the recessed region may compensate for arching deformation, to improve flatness of a surface opposite to the conductive plating layer on the mounting bracket, and avoid an impression when the electronic device is exposed to light.

In a possible implementation, an orthographic projection of the recessed region toward the conductive plating layer completely coincides with the conductive plating layer.

In a possible implementation, a conductive member, where an end of the conductive member is electrically connected to the conductive plating layer, and another end of the conductive member is electrically connected to a metal middle plate of the middle frame.

In a possible implementation, the conductive member is a conductive elastomer or a conductive foam.

In a possible implementation, the electronic device is a foldable device.

In a possible implementation, the mounting bracket is a conductive mounting bracket made of metal alloy or stainless steel.

In a possible implementation, a thickness of the conductive plating layer is less than or equal to 0.2 mm.

According to a fourth aspect of the embodiments of this application, a display module is provided, and is applied to an electronic device. The display module includes at least a display layer and a mounting bracket, where the mounting bracket includes a first surface and a second surface arranged opposite to the first surface, and the first surface faces the display layer;

a conductive plating layer is arranged on a partial region of the second surface of the mounting bracket, and a conductive transition layer is arranged at an outer periphery of the conductive plating layer; and the conductive plating layer is configured to be electrically connected to a middle frame of the electronic device.

According to a fifth aspect of the embodiments of this application, a display module is provided, and is applied to an electronic device. The display module includes at least a display layer and a mounting bracket, where the mounting bracket includes a first surface and a second surface arranged opposite to the first surface, and the first surface faces the display layer;

a conductive plating layer is arranged on a partial region of the second surface of the mounting bracket, a plurality of openings are provided on the conductive plating layer, and hole bottoms of the openings extend to the second surface; and the conductive plating layer is configured to be electrically connected to a middle frame of the electronic device.

According to a sixth aspect of the embodiments of this application, a display module is provided, and is applied to an electronic device. The display module includes at least a display layer and a mounting bracket, where the mounting bracket includes a first surface and a second surface arranged opposite to the first surface, and the first surface faces the display layer;

a recessed region is provided on the first surface of the mounting bracket, and a conductive plating layer is arranged at a position opposite to the recessed region on the second surface of the mounting bracket; and the conductive plating layer is configured to be electrically connected to a middle frame of the electronic device.

BRIEF DESCRIPTION OF REFERENCE NUMERALS OF THE ACCOMPANYING DRAWINGS

100—electronic device; 10—display module; 10a—first portion; 10b—second portion;
10c—third portion; 11—cover; 12—display layer; 13—mounting bracket;
131—conductive plating layer; 13a—first surface; 13b—second surface; 132—first sub-transition layer;
133—second sub-transition layer; 134—opening; 135—recessed region; 20—middle frame;
21—first middle frame; 211—first frame; 212—first metal middle plate;
22—second middle frame; 221—second frame; 222—second metal middle plate; 23—rotary connector;
30—front cover; 40—battery cover; 50—circuit board; 60—battery; and
70—conductive member.

DESCRIPTION OF EMBODIMENTS

Terms used in implementations of this application are merely intended to explain specific embodiments of this application rather than limit this application. The following describes implementations of the embodiments of this application in detail with reference to the accompanying drawings.

The embodiments of this application provide an electronic device. The electronic device may be, but is not limited to, a mobile terminal, a fixed terminal, or a foldable terminal having a display module such as a mobile phone, a tablet computer, a notebook computer, an ultra-mobile personal computer (UMPC), a handheld computer, an intercom, a netbook, a POS terminal, a personal digital assistant (PDA), a drive recorder, and a security device.

In the embodiments of this application, an example in which a mobile phone is the electronic device is used for description, and specifically, a foldable mobile phone is used as an example for description. The foldable mobile phone may be an inward foldable mobile phone (that is, a display module is folded inward) or an outward foldable mobile phone (that is, a display module is folded outward). In the embodiments of this application, the inward foldable mobile phone is specifically used as an example for description.

Figure 1:
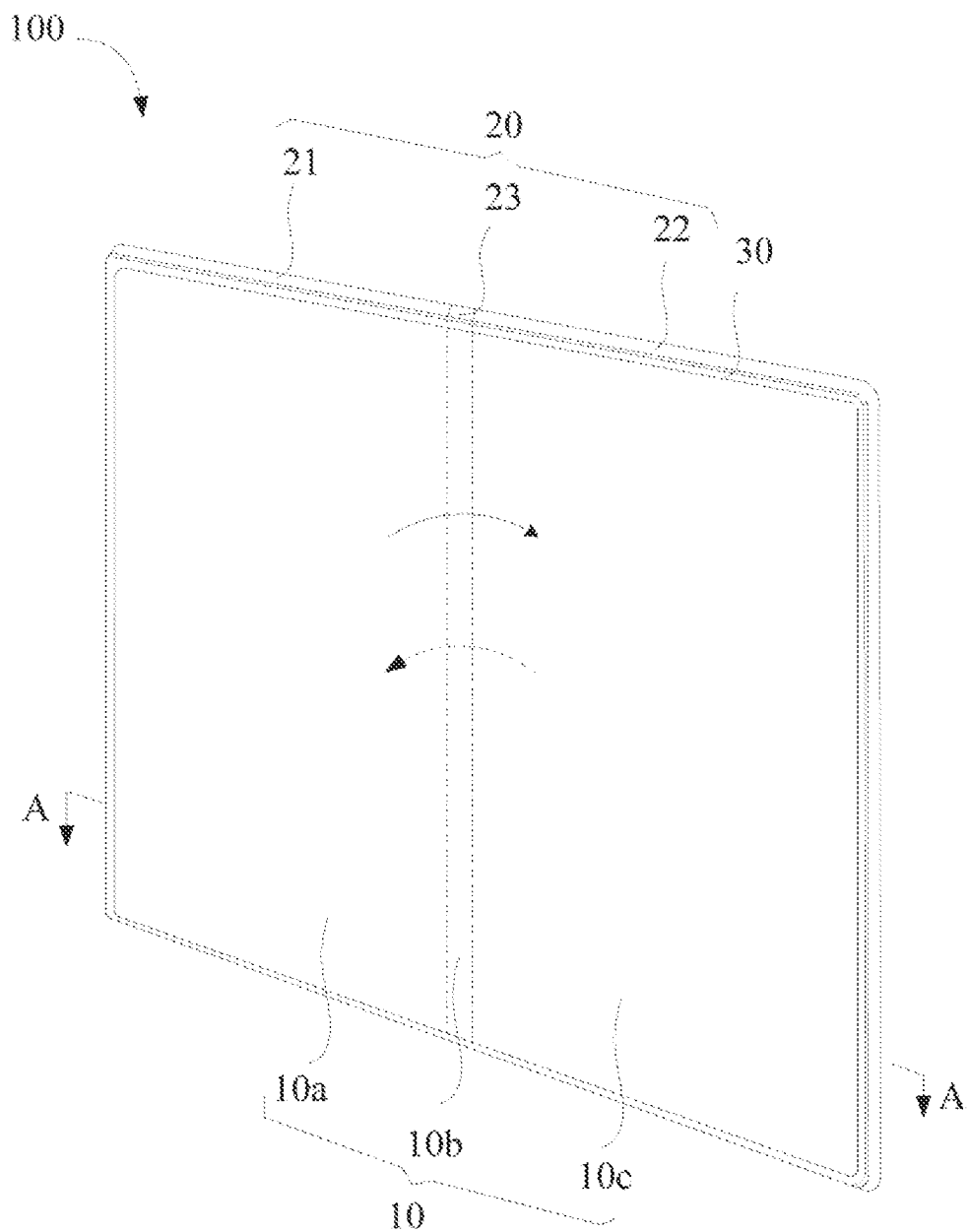
FIG. 1 is a schematic diagram of a three-dimensional structure of an electronic device in an unfolded state according to an embodiment of this application.

FIG. 1 is a schematic diagram of a mobile phone in an unfolded state. As shown in FIG. 1, an electronic device 100 may include: a display module 10, a middle frame 20, a battery cover 40, and a front cover 30. The display module 10 and the front cover 30 are located at one side of the middle frame 20, the battery cover 40 is located at the other side of the middle frame 20, and the front cover 30 is connected to the middle frame 20.

The front cover 30 is configured to block a connection position between the display module 10 and the middle frame 20. There may be a certain gap between the front cover 30 and a surface of the display module 10, or the front cover 30 and the surface of the display module 10 may be in contact but not sealed, so that the front cover 30 is not likely to obstruct bending of the display module 10 when the mobile phone is folded. The front cover 30 may be an insulation front cover.

In the embodiments of this application, as shown in FIG. 1, the middle frame 20 may include a first middle frame 21, a second middle frame 22, and a rotary connector 23. The first middle frame 21 and the second middle frame 22 are rotated relative to the rotary connector 23, for example, an end of the first middle frame 21 and an end of the second middle frame 22 are rotatably connected to two sides of the rotary connector 23 respectively, and the other end of the first middle frame 21 and the other end of the second middle frame 22 are rotatable around the rotary connector 23.

It needs to be noted that, to switch between a folded state and an unfolded state of the mobile phone, when the first middle frame 20 and the second middle frame 20 are rotated, the front cover 30, the battery cover 40, and the display module 10 may all be folded or unfolded with rotation of the first middle frame 20 and the second middle frame 20.

Figure 2:
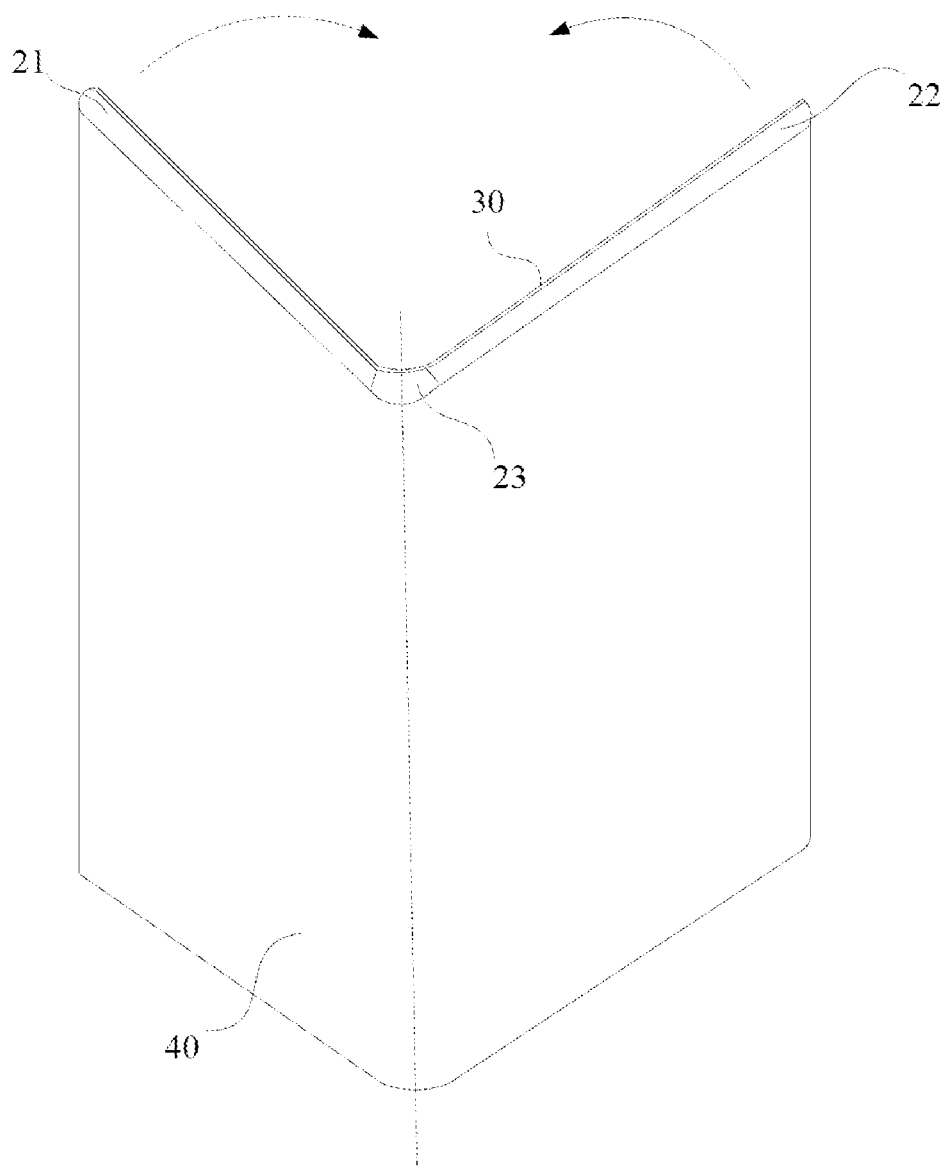
FIG. 2 is a schematic diagram of an electronic device in a semi-folded state according to an embodiment of this application.
Figure 3:
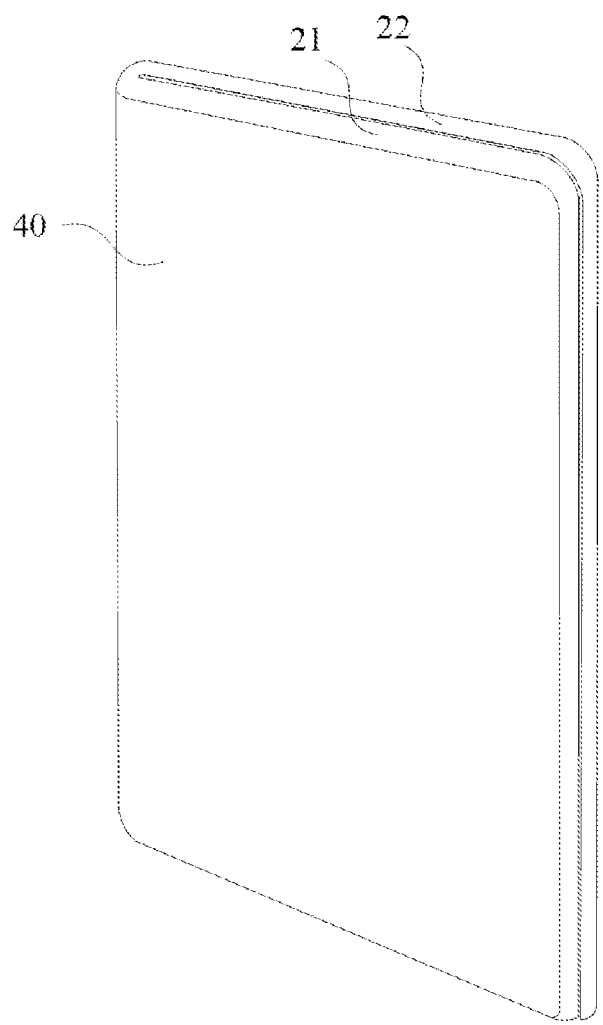
FIG. 3 is a schematic diagram of an electronic device in a folded state according to an embodiment of this application.

For example, as shown in FIG. 1, when the mobile phone is in the unfolded state, the first middle frame 21 and the second middle frame 22 are rotated to a maximum state relative to the rotary connector 23, and the front cover 30, the battery cover 40, and the display module 10 are all in the unfolded state. When the first middle frame 21 and the second middle frame 22 are rotated in a direction of a dashed arrow or a solid arrow in FIG. 1, as shown in FIG. 2, the mobile phone may be in a semi-folded state, the first middle frame 21 and the second middle frame 22 are close to each other, and the front cover 30, the battery cover 40, and the display module 10 are in a bent state. FIG. 3 is a schematic diagram of a mobile phone in a folded state. As shown in FIG. 3, the first middle frame 21 and the second middle frame 22 are opposite, and the front cover 30, the battery cover 40, and the display module 10 are all in the folded state. Therefore, in the embodiments of this application, the first middle frame 20, the second middle frame 20, the front cover 30, the battery cover 40, and the display module 10 are switchable between the folded and unfolded states.

Because the display module 10 also needs to be folded during a folding process of the mobile phone, in the embodiments of this application, the display module 10 may be an organic light-emitting diode (OLED) display screen or another bendable flexible display screen.

The display module 10 may be configured to display an image, a text, a video, or the like. As shown in FIG. 1, the display module 10 includes a first portion 10a, a second portion 10b, and a third portion 10c. The second portion 10b is located between the first portion 10a and the third portion 10c. The first portion 10a, the second portion 10b, and the third portion 10c are all located on a same side of the first middle frame 21 and the second middle frame 22. In addition, the first portion 10a is fixed to the first middle frame 21. The second portion 10b is fixed to the rotary connector 23 between the first middle frame 21 and the second middle frame 22. The third portion 10c is fixed to the second middle frame 22. When the mobile phone is folded, the second portion 10b is bent.

It is understandable that, when the electronic device 100 is an inward foldable mobile phone, as shown in FIG. 1, the electronic device 100 is in the unfolded state, and the first portion 10a, the second portion 10b, and the third portion 10c are at an angle of approximately 180 degrees (slight deviations are allowed, for example, 165 degrees, 177 degrees, or 185 degrees). In this case, the display module 10 has a continuous display region with a large area, that is, the display module 10 may achieve large screen display, making user experience better. When the electronic device 100 is in the folded state, the display module 10 is located between the first middle frame 21 and the second middle frame 22 (as shown in FIG. 3), the second portion 10b is bent, and the first portion 10a and the third portion 10c overlap each other.

Certainly, in some examples, the electronic device 100 is an outward foldable mobile phone (that is, the display module 10 is exposed when the electronic device is in the folded state). In this case, the first middle frame 21 and the second middle frame 22 are located between the first portion 10a and the third portion 10c when the electronic device 100 is in the folded state.

Figure 4:
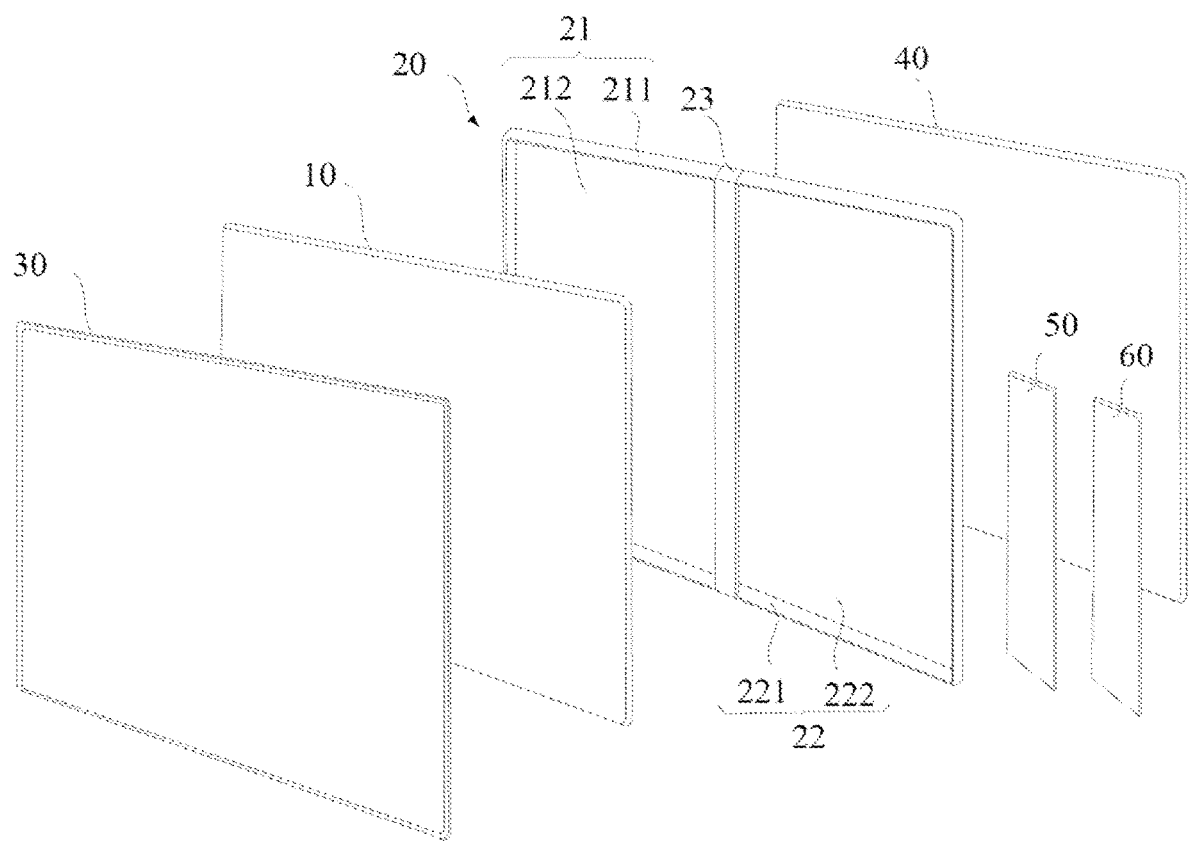
FIG. 4 is an exploded schematic diagram of an electronic device according to an embodiment of this application.

FIG. 4 is an exploded schematic diagram of a mobile phone. As shown in FIG. 4, the first middle frame 21 may include: a first metal middle plate 212 and a first frame 211 enclosed on an outer edge of the first metal middle plate 212. The first frame 211 may include a side frame, a top frame, and a bottom frame.

The second middle frame 22 may include: a second metal middle plate 222 and a second frame 221 enclosed on an outer edge of the second metal middle plate 222. The second frame 221 may include: a side frame, a top frame, and a bottom frame. The rotary connector 23 may be respectively connected to the first metal middle plate 212 and the second metal middle plate 222.

In the embodiments of this application, the first frame 211 and the second frame 221 are fixedly connected to the first metal middle plate 212 and the second metal middle plate 222 through injection molding. The first metal middle plate 212 and the second metal middle plate 222 may be an aluminum plate, an aluminum alloy, or a magnesium alloy. The first frame 211 and the second frame 221 may be metal frames, glass frames, or ceramic frames.

As shown in FIG. 4, the electronic device 100 may further include a circuit board 50 and a battery 60. The battery 60 may be connected to a charging management module and the circuit board 50 through a power management module. The power management module receives an input from the battery 60 and/or an input from the charging management module, and supplies power to a processor, an internal memory, an external memory, a foldable display module 10, a camera module, a communication module, and the like. The power management module may be further configured to monitor a parameter such as a capacity of the battery 60, a cycle count of the battery 60, or a health state (electric leakage and impedance) of the battery 60. In some other embodiments, the power management module may also be arranged in the processor of the circuit board 50. In some other embodiments, the power management module and the charging management module may also be arranged in a same device.

It may be understood that the schematic structure in the embodiments of this application constitutes no specific limitation on the electronic device 100. In some other embodiments of this application, the electronic device 100 may include more or fewer components than those shown in the figure, or some components may be combined, or some components may be split, or different component arrangements may be used. For example, the electronic device 100 may further include devices such as a camera (for example, a front-facing camera and a rear-facing camera) and a camera flash.

Figure 5:
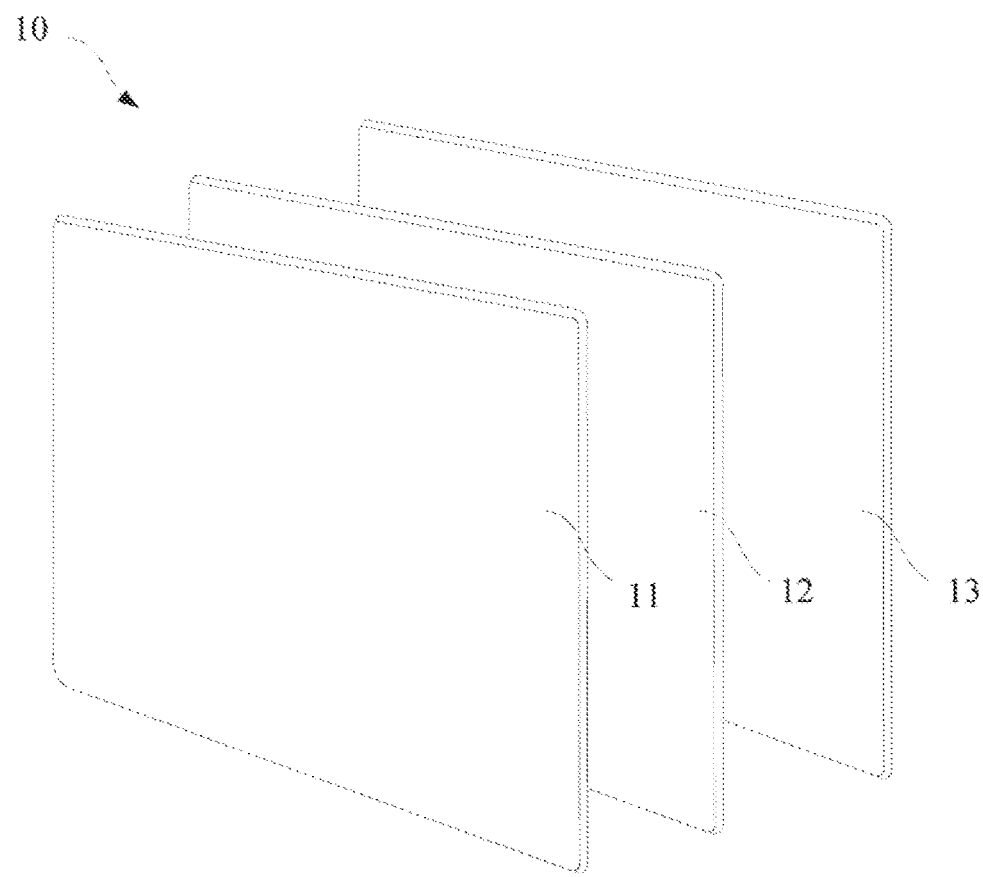
FIG. 5 is a schematic structural diagram of a display module in an electronic device according to an embodiment of this application.

As shown in FIG. 5, the display module 10 may include: a cover 11, a display layer 12, and a mounting bracket 13. The display layer 12 is located between the cover 11 and the mounting bracket 13, and the mounting bracket 13 is configured to support the display layer 12. To ensure that the mounting bracket 13 has a supporting performance, the mounting bracket 13 is often made of a metal material. However, to reduce a risk of signal interference and electrostatic discharge (ESD) during whole machine design, it is necessary to electrically connect a suspended metal (for example, the mounting bracket 13) to the middle frame 20 to achieve grounding.

The mounting bracket 13 is usually electrically connected to the middle frame 20 through a conductive member 70, and the conductive member 70 may be a conductive material such as an elastomer or a conductive foam.

The mounting bracket 13 is generally made of a copper layer, because the copper layer has good electrical conductivity, and may achieve a good grounding performance with the middle frame 20. However, when the electronic device 100 is a foldable device, due to a weight requirement of a whole machine, and a requirement that the mounting bracket 13 for a foldable mobile phone should not only meet a supporting performance, but also have a bending function, a thickness of the mounting bracket 13 should be small. However, if the mounting bracket 13 continues to be made of the copper layer, when a thickness of the copper layer is small, the copper layer cannot play a good supporting role on the display layer 12. Therefore, in a foldable device, the mounting bracket 13 is not suitable for being made of the copper layer. Generally, in the foldable device, the mounting bracket 13 is made of a thin material which has a good supporting performance such as an alloy material or a stainless steel.

Figure 6:
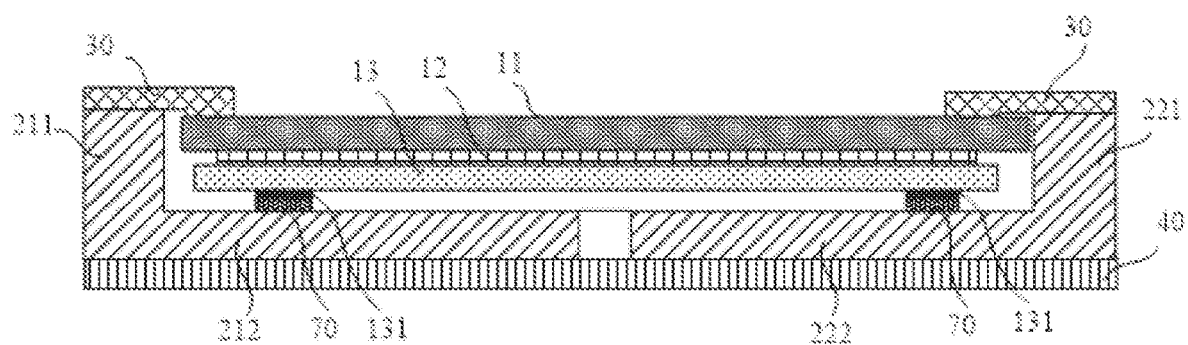
FIG. 6 is a schematic cross-sectional structural diagram of an electronic device along an A-A direction of FIG. 1 according to an embodiment of this application.
Figure 7:
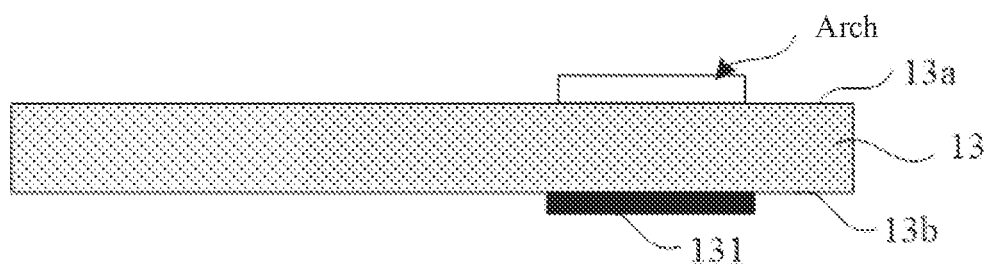
FIG. 7 is a schematic cross-sectional structural diagram of a mounting bracket in an electronic device.

However, when the mounting bracket 13 is made of an alloy material (such as an aluminum alloy or a copper alloy), or a stainless steel, or the like, because the alloy material or stainless steel has weak electrical conductivity, when the mounting bracket 13 is grounded with the middle frame 20 through the conductive member 70, to improve electrical conductivity of a surface of the mounting bracket 13, as shown in FIG. 6 and FIG. 7, the mounting bracket 13 includes a first surface 13a and a second surface 13b, the first surface 13a faces the display layer 12, the second surface 13b faces the first metal middle plate 212 and the second metal middle plate 222 of the middle frame 20, a nickel/gold or another conductive material is plated at a grounding position of the second surface 13b of the mounting bracket 13 to form a conductive plating layer 131, and the conductive plating layer 131 may improve a conductive performance of the grounding position of the mounting bracket 13, to ensure a stable and effective electrical connection between the mounting bracket 13 and the middle frame 20 through the conductive member 70 and the conductive plating layer 131.

Figure 8:
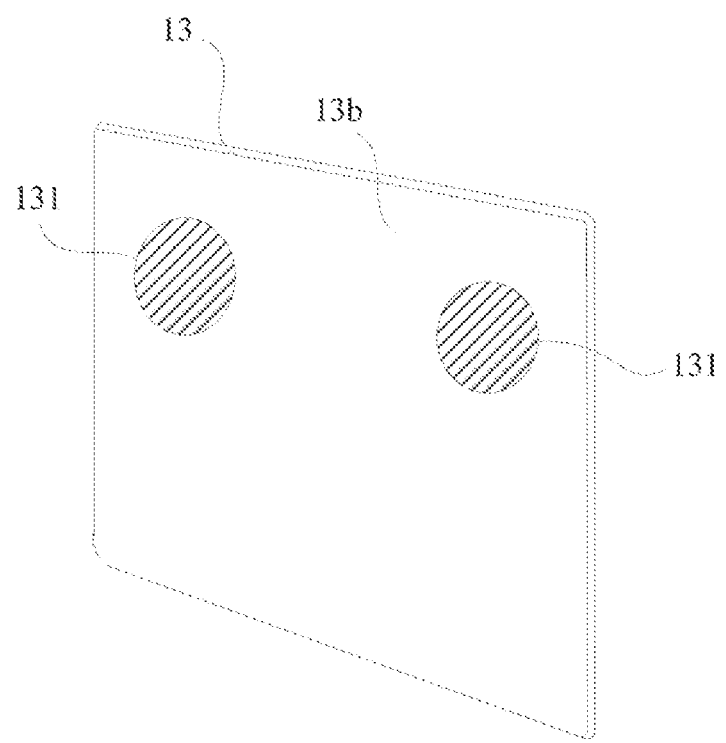
FIG. 8 is a schematic diagram of a three-dimensional structure of a mounting bracket and a conductive plating layer in an electronic device.

As shown in FIG. 7 and FIG. 8, the conductive plating layer 131 is arranged at a local region of the second surface 13b of the mounting bracket 13, and two (referring to FIG. 8) or more conductive plating layers 131 may be arranged. When there are two conductive plating layers 131, as shown in FIG. 6, one conductive plating layer 131 may be electrically connected to the first metal middle plate 212 of the first middle frame 20, to ground a side of the mounting bracket, and the other conductive plating layer 131 may be electrically connected to the second metal middle plate 222 of the second middle frame 20, to ground the other side of the mounting bracket.

It needs to be noted that, a shape of the conductive plating layer 131 includes but is not limited to a circular shape shown in FIG. 8. In some examples, the shape of the conductive plating layer 131 may further be polygonal, elliptical, or another irregular shape.

However, an internal stress in a metal generated after the conductive plating layer 131 is arranged on the second surface 13b of the mounting bracket 13 is uneven, resulting in arching deformation in a region opposite to a position of the conductive plating layer 131 on the first surface 13a of the mounting bracket 13 (as shown in FIG. 7). Therefore, when the electronic device is in normal use, the arching deformation is not easily observed on the electronic device due to an action of the display layer 12. However, when a screen of the electronic device is off and exposed to light, reflection of the arched region to the light is uneven, resulting in observable impressions on an appearance of the region, for example, an uneven impression appears on a position of the display module 10 opposite to the conductive plating layer 131, thus affecting an appearance of the electronic device.

To solve the foregoing problems, in the electronic device provided in the embodiments of this application, the conductive transition layer is added at the periphery of the conductive plating layer 131, or an outer edge of the conductive plating layer 131 is set to be in an uneven serrated shape, or a hole is dug on the conductive plating layer 131, so that a material internal stress generated by a metal plating layer arranged on the mounting bracket 13 is gradually reduced. In this way, a generated arch is gradually reduced to a large flat region, to reduce the impression degree. Alternatively, a region opposite to the conductive plating layer 131 on the first surface 13a of the mounting bracket 13 is thinned to form a recessed region, and the recessed region may compensate for arching deformation, to improve flatness of a surface opposite to the conductive plating layer 131 on the mounting bracket 13, and avoid an impression when the electronic device is exposed to light.

It needs to be noted that, the large flat region specifically refers to a plane region on the first surface of the mounting bracket except an arching deformation region.

The following describes several solutions provided in the embodiments of this application in detail through several embodiments.

Embodiment 1

Figure 9:
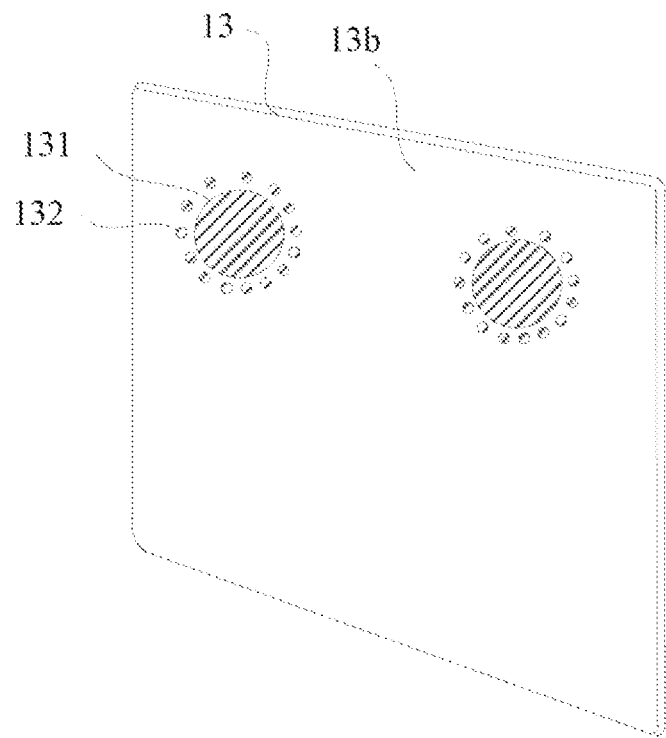
FIG. 9 is a schematic diagram of a three-dimensional structure of a mounting bracket and a conductive plating layer of an electronic device according to an embodiment of this application.

In the embodiment of this application, as shown in FIG. 9, a conductive plating layer 131 is arranged in a partial region of a second surface 13b of a mounting bracket 13, and a conductive transition layer is arranged at an outer periphery of the conductive plating layer 131. As shown in FIG. 9, the conductive transition layer includes a plurality of first sub-transition layers 132, and the plurality of first sub-transition layers 132 are spaced apart around the outer periphery of the conductive plating layer 131 for one or more turns. For example, in FIG. 9, the plurality of first sub-transition layers 132 are spaced apart around the outer periphery of the conductive plating layer 131 for one turn. Certainly, in some examples, the plurality of first sub-transition layers 132 are spaced apart around the outer periphery of the conductive plating layer 131 for a plurality of turns.

In the embodiment of this application, the conductive plating layer 131 is electrically connected to a middle frame 20 to ground the mounting bracket 13. Certainly, in some examples, the conductive transition layer may further be electrically connected to the middle frame 20 to ground the mounting bracket 13, or both the conductive plating layer 131 and the conductive transition layer may be electrically connected to the middle frame 20, to implement a function of grounding a plurality of positions of the mounting bracket 13.

In the embodiment of this application, the plurality of first sub-transition layers 132 are spaced apart from an outer edge of the conductive plating layer 131. For example, as shown in FIG. 9, the plurality of first sub-transition layers 132 are spaced apart from the outer edge of the conductive plating layer 131, so that the two plating layers are spaced apart from each other, to reduce an internal stress in a metal.

It should be noted that, an area of each of the first sub-transition layers 132 is smaller than an area of the conductive plating layer 131, thus ensuring that an internal stress of the first sub-transition layer 132 is smaller than an internal stress of the conductive plating layer 131, so that arching deformation generated by the first sub-transition layer 132 is smaller than arching deformation generated by the conductive plating layer 131.

Therefore, in the embodiment of this application, the plurality of first sub-transition layers 132 are arranged at an outer periphery of the conductive transition layer, and the area of each of the first sub-transition layers 132 is smaller than the area of the conductive plating layer 131. In this way, an internal stress at the first sub-transition layer 132 on the mounting bracket 13 is less than an internal stress at a position of the conductive plating layer 131, so that the arching deformation generated by the first sub-transition layer 132 is smaller than the arching deformation generated by the conductive plating layer 131. Therefore, in the embodiment of this application, a material internal stress generated on the mounting bracket 13 from the conductive plating layer 131 to the first sub-transition layer 131 is gradually reduced, and a generated arch is gradually reduced to a large flat region. In this way, after a screen of an electronic device is off and is exposed to light, an uneven degree occurring when the light is reflected is gradually reduced from large to small under a transition action of the first sub-transition layer 132, thereby gradually reducing an impression degree. Therefore, the impression degree is gradually weakened visually, and an impression on the electronic device is not visually obvious.

Figure 10:
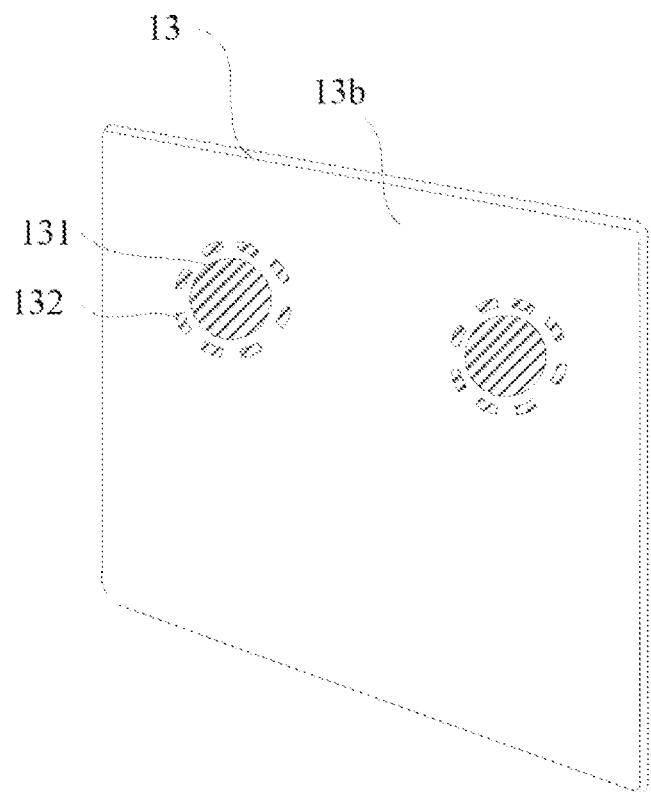
FIG. 10 is a schematic diagram of a three-dimensional structure of a mounting bracket and a conductive plating layer of an electronic device according to an embodiment of this application.

In the embodiment of this application, as shown in FIG. 9, a shape of the first sub-transition layer 132 may be circular, or as shown in FIG. 10, the shape of the first sub-transition layer 132 may be polygonal.

Certainly, in some examples, the shape of the first sub-transition layer 132 may further be elliptical, triangular, or another shape.

Figure 11A:
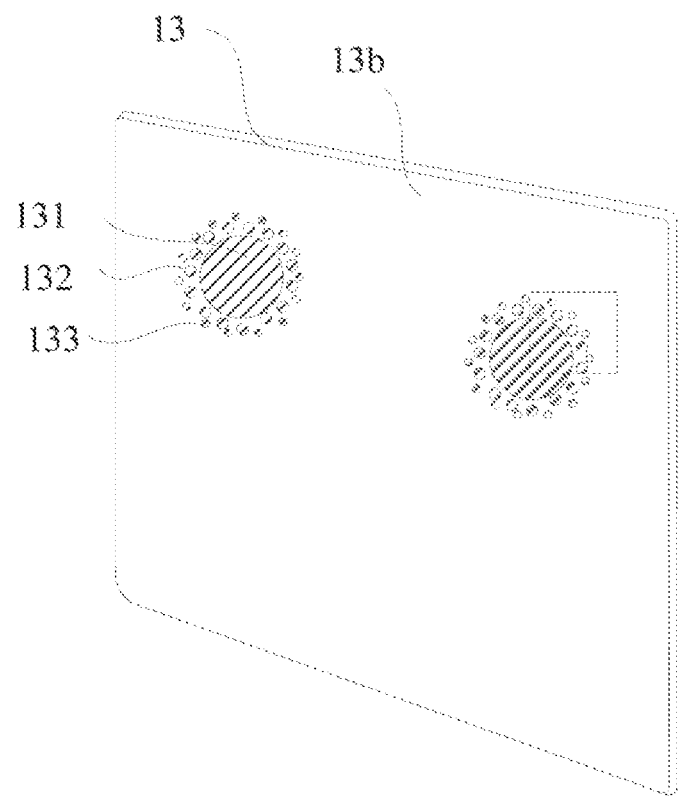
FIG. 11A is a schematic diagram of a three-dimensional structure of a mounting bracket and a conductive plating layer of an electronic device according to an embodiment of this application.

In a possible implementation, as shown in FIG. 11A, the conductive transition layer further includes a plurality of second sub-transition layers 133. The plurality of second sub-transition layers 133 are located at an outer periphery of the plurality of first sub-transition layers 132.

As shown in FIG. 11A, an area of the second sub-transition layer 133 is smaller than an area of the first sub-transition layer 132. Thus, areas of the conductive plating layer 131, the first sub-transition layer 132, and the second sub-transition layer 133 are gradually reduced, a material internal stress generated from the conductive plating layer 131, the first sub-transition layer 132 to the second sub-transition layer 133 is gradually reduced, and an arch generated on a first surface 13a of the mounting bracket 13 is gradually reduced to a large flat region, so that after the screen of the electronic device is off and is exposed to light, an uneven degree in light reflection is further gradually reduced from large to small, to gradually reduce the impression degree.

Figure 11B:
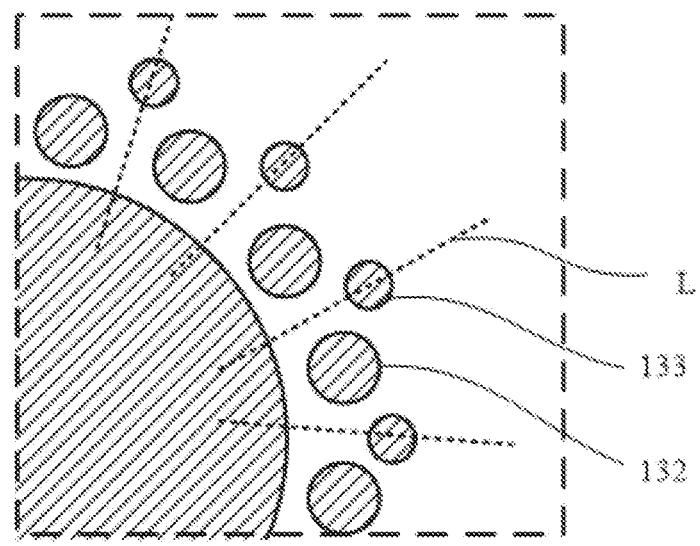
FIG. 11B is an enlarged schematic view of a dashed box in FIG. 11A.

In the embodiment of this application, when the plurality of second sub-transition layers 133 are distributed at the outer periphery of the plurality of first sub-transition layers 132, as shown in FIG. 11B, each of the second sub-transition layers 133 is located on a centerline L between two adjacent first sub-transition layers 132. In this way, it is ensured that the arch generated on the first surface 13a of the mounting bracket 13 is uniformly and gradually reduced to a flat region, the impression on the electronic device is uniformly distributed, and the impression is not easily distributed unevenly.

Certainly, in some examples, the second sub-transition layer 133 may also be arranged away from the centerline L between two adjacent first sub-transition layers 132.

In the embodiment of this application, as shown in FIG. 11A, a shape of the second sub-transition layer 133 may be circular, or the shape of the second sub-transition layer 133 may also be polygonal, for example, a square as shown in FIG. 10.

Certainly, in some examples, the shape of the second sub-transition layer 133 may further be elliptical, triangular, or another shape.

It needs to be noted that, shapes of the first sub-transition layer 132 and the second sub-transition layer 133 may be the same or different. When two conductive plating layers 131 are arranged on the first surface 13a of the mounting bracket 13, the first sub-transition layer 132 and the second sub-transition layer 133 at an outer periphery of the two conductive plating layers 131 may be the same or different.

It should be noted that, when the shapes of the first sub-transition layer 132 and the second sub-transition layer 133 are polygons (such as triangles or polygons), because a metal plating layer of a polygon has a sharp corner, an internal stress is more obviously concentrated. When the shapes of the first sub-transition layer 132 and the second sub-transition layer 133 are circular, the internal stress is relatively dispersed, so a generated arching deformation degree is less than an arching deformation degree caused by a polygonal metal plating layer.

Figure 12:
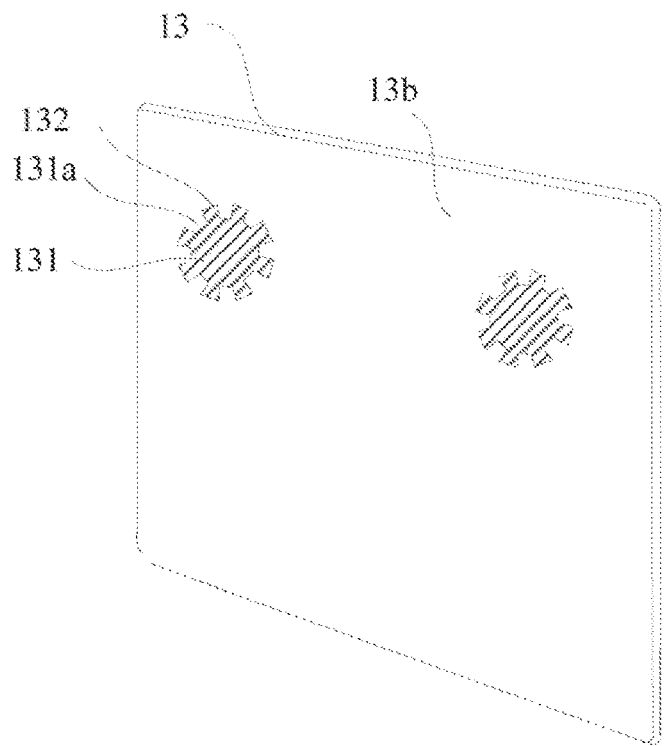
FIG. 12 is a schematic diagram of a three-dimensional structure of a mounting bracket and a conductive plating layer of an electronic device according to an embodiment of this application.

In a possible implementation, as shown in FIG. 12, the plurality of first sub-transition layers 132 are spaced apart along an outer periphery of the conductive plating layer 131 on the outer edge of the conductive plating layer 131, for example, the plurality of first sub-transition layers 132 are adjacent to the outer edge of the conductive plating layer 131, and two adjacent first transition layers and a part of the outer edge of the conductive plating layer 131 form a notch 131a, so that the outer edge of the conductive plating layer 131 is serrated. In this way, the outer edge of the conductive plating layer 131 has an uneven and serrated structure, and a notch 131a is provided between the serrated structures, so that a material internal stress generated by a metal plating layer arranged on the mounting bracket 13 is reduced. In this way, a generated arch is reduced to a large flat region, to reduce the impression degree.

Figure 13:
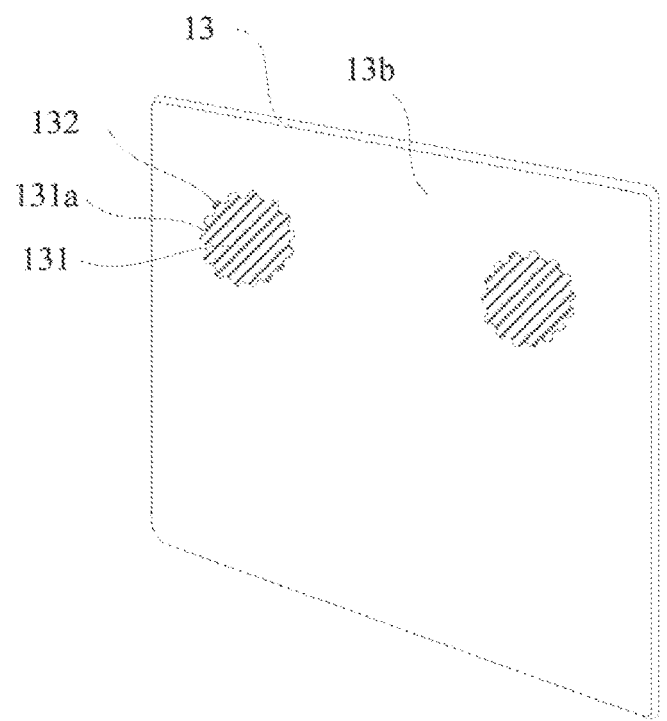
FIG. 13 is a schematic diagram of a three-dimensional structure of a mounting bracket and a conductive plating layer of an electronic device according to an embodiment of this application.

In the embodiment of this application, as shown in FIG. 12, the shape of the first sub-transition layer 132 may be polygonal, or as shown in FIG. 13, the shape of the first sub-transition layer 132 may be semicircular. Certainly, in some examples, the shape of the first sub-transition layer 132 may further be polygonal, triangular, or sector-shaped. In this embodiment, shapes of the plurality of first sub-transition layers 132 may be the same or different, and shapes of the plurality of second sub-transition layers 133 may be the same or different. In the embodiment of this application, the shape of the first sub-transition layer 132 is not limited.

It needs to be noted that, in FIG. 11A and FIG. 12, the second sub-transition layers 133 may further be arranged at positions opposite the notches 131a, so that the first sub-transition layer 132 is arranged next to the outer edge of the conductive plating layer 131, and the second sub-transition layer 133 is spaced apart from the outer edge of the conductive plating layer 131.

Embodiment 2

Figure 14:
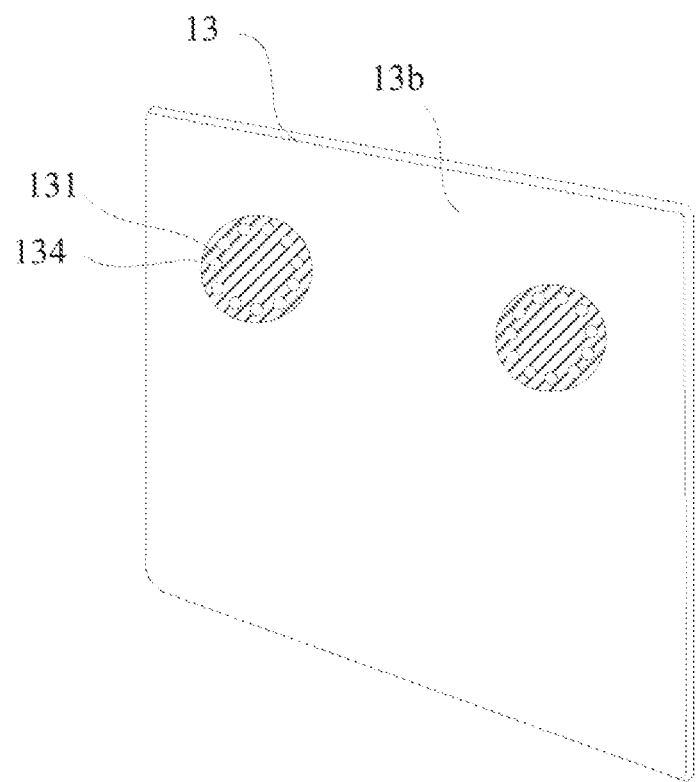
FIG. 14 is a schematic diagram of a three-dimensional structure of a mounting bracket and a conductive plating layer of an electronic device according to an embodiment of this application.

A difference from the foregoing embodiment is as follows: In this embodiment, as shown in FIG. 14, a plurality of openings 134 are provided on a conductive plating layer 131, and a hole bottom of the opening 134 extends to a second surface 13b of a mounting bracket 13. Thus, the conductive plating layer 131 is a non-connected plating layer, the opening 134 is provided on the conductive plating layer 131, and the opening 134 is provided to release a material internal stress generated by the conductive plating layer 131, thereby reducing a stress of the conductive plating layer 131. In this way, a generated arch is gradually reduced to a large flat region, to reduce an impression degree.

In the embodiment of this application, the plurality of openings 134 are spaced apart around a center of the conductive plating layer 131 for one or more turns. For example, as shown in FIG. 14, the plurality of openings 134 are spaced apart around the center of the conductive plating layer 131 for one turn. The plurality of openings 134 may be close to an outer edge of the conductive plating layer 131, which facilitates reduction of an internal stress of the conductive plating layer 131. Certainly, in some examples, the plurality of openings 134 may further be located at any position between the center and the outer edge of the conductive plating layer 131.

In the embodiment of this application, as shown in FIG. 14, the opening 134 may be a round hole, or the opening 134 may also be a square hole or an elliptical hole. In the embodiment of this application, a shape of the opening 134 is not limited.

Embodiment 3

Figure 15:
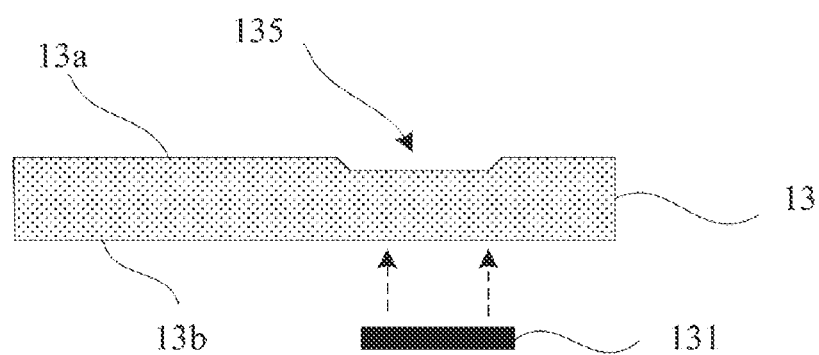
FIG. 15 is a schematic diagram of a split structure of a mounting bracket and a conductive plating layer of an electronic device according to an embodiment of this application.
Figure 16:
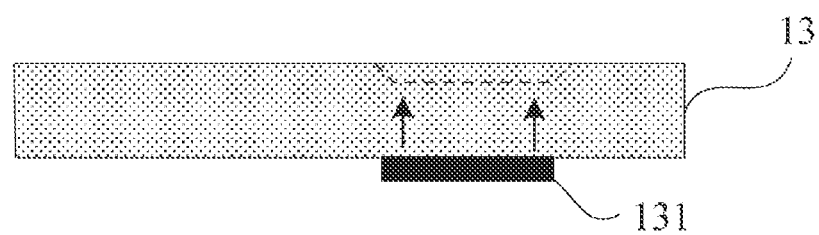
FIG. 16 is a schematic diagram of a split structure of a mounting bracket and a conductive plating layer of an electronic device according to an embodiment of this application.

In the embodiment of this application, as shown in FIG. 15, a recessed region 135 is provided on a first surface 13a of a mounting bracket 13, and a conductive plating layer 131 is arranged at a position opposite to the recessed region 135 on a second surface 13b of the mounting bracket 13. Thus, when an internal stress is generated in the conductive plating layer 131 on the second surface 13b of the mounting bracket 13, the recessed region 135 on the first surface 13a of the mounting bracket 13 is arched and deformed, to compensate for arching deformation through the recessed region 135. In this way, as shown in FIG. 16, no arching deformation occurs on the first surface 13a of the mounting bracket 13, and flatness of the first surface 13a of the mounting bracket 13 is improved, thereby avoiding occurrence of an impression when an electronic device is exposed to light.

Therefore, in the electronic device provided in the embodiment of this application, the recessed region 135 is formed on a region opposite to the conductive plating layer 131 on the first surface 13a of the mounting bracket 13, and the recessed region 135 may compensate for the arching deformation, to improve flatness of a surface opposite to the conductive plating layer 131 on the mounting bracket 13 and avoid an impression when the electronic device is exposed to light.

In the embodiment of this application, when the recessed region 135 is formed on the first surface 13a of the mounting bracket 13, specifically, a position opposite to conductive plating on the first surface 13a of the mounting bracket 13 may be thinned by performing thinning processing, such as etching, on the first surface 13a of the mounting bracket 13. It needs to be noted that, a depth of the recessed region 135 is specifically set based on a height of the arching deformation in FIG. 7.

In a possible implementation, a forward projection of the recessed region 135 toward the conductive plating layer 131 completely coincides with the conductive plating layer 131, ensuring that arching deformation caused by the conductive plating layer 131 can be compensated in the recessed region 135 and that arching deformation does not occur on the first surface 13a of the mounting bracket 13 when the conductive plating layer 131 is arranged on the second surface 13b of the mounting bracket 13.

It needs to be noted that, the technical solution provided in this application is described by using a foldable mobile phone as an example. In some examples, the technical solution provided in this application is also applicable to a non-foldable mobile phone. For example, the solution provided in this application is also applicable to a bar phone. In this case, when the solution is adopted in the bar phone, because the mounting bracket 13 is made of a thin material such as an alloy or a stainless steel, a thickness of the display module 10 may be reduced, to reduce a thickness of the bar phone, or to save space in the bar phone for arranging another device.

In the descriptions of the embodiments of this application, it should be noted that, unless expressly stated and defined otherwise, the terms "mounting", "connected", "connection", or the like are to be construed broadly, for example, as a fixed connection, an indirect connection through an intermediary, or internal communication between two elements or mutual interaction relationship between two elements. A person of ordinary skill in the art may understand the specific meanings of the foregoing terms in the embodiments of this application according to specific situations.

In the embodiments of this application, it is implied that an apparatus or element in question needs to have a particular orientation, or needs to be constructed and operated in a particular orientation, and therefore cannot be construed as a limitation on the embodiments of this application. In the description of the embodiments of this application, unless otherwise exactly and specifically ruled, "a plurality of" means two or more than two.

In the specification of the embodiments of this application, claims, and accompanying drawings, the terms "first", "second", "third", "fourth", and so on (if existing) are intended to distinguish between similar objects but do not necessarily indicate a specific order or sequence. It is to be understood that data used in this way is interchangeable in a suitable case, so that the embodiments of the embodiments of this application described herein can be implemented in a sequence in addition to the sequence shown or described herein. Furthermore, the terms "may include" and "have" and any variation thereof are intended to cover non-exclusive inclusion. For example, processes, methods, systems, products, or devices including a series of steps or units are not necessarily limited to those steps or units expressly listed, and instead, may include other steps or units not expressly listed or inherent to these processes, methods, products, or devices.

Finally, it should be noted that: the foregoing embodiments are merely intended for describing the technical solutions of the embodiments of this application other than limiting this application. Although the embodiments of this application are described in detail with reference to the foregoing embodiments, a person of ordinary skill in the art should understand that: modifications may still be made to the technical solutions in the foregoing embodiments, or equivalent replacements may be made to some of or all the technical features; and such modifications or replacements will not cause the essence of corresponding technical solutions to depart from the scope of the technical solutions in the embodiments of the embodiments of this application.

What is claimed is:

1. An electronic device, comprising:
  a display device;
  a middle frame; and
  a battery cover,
  wherein the display device and the battery cover are respectively located at two sides of the middle frame;
  wherein the display device comprises at least a display layer and a mounting bracket, wherein the mounting bracket comprises a first surface and a second surface, the first surface faces the display layer, and the second surface faces the middle frame;
  wherein a conductive plating layer is arranged on a partial region of the second surface of the mounting bracket, and a conductive transition layer is arranged at an outer periphery of the conductive plating layer; and
  wherein the conductive plating layer is electrically connected to the middle frame.

2. The electronic device according to claim 1,
  wherein the conductive transition layer comprises a plurality of first sub-transition layers, and the plurality of first sub-transition layers are spaced apart around the outer periphery of the conductive plating layer for one or more turns; and
  wherein an area of each of the first sub-transition layers is smaller than an area of the conductive plating layer.

3. The electronic device according to claim 2, wherein the plurality of first sub-transition layers and an outer edge of the conductive plating layer are spaced apart.

4. The electronic device according to claim 2,
  wherein the conductive transition layer further comprises a plurality of second sub-transition layers; and wherein the plurality of second sub-transition layers are located at an outer periphery of the plurality of first sub-transition layers.

5. The electronic device according to claim 4, wherein an area of the second sub-transition layer is smaller than an area of the first sub-transition layer.

6. The electronic device according to claim 4, wherein each of the second sub-transition layers is located on a centerline between two adjacent first sub-transition layers.

7. The electronic device according to claim 4, wherein shapes of the first sub-transition layer and the second sub-transition layer are any one of a circle, a polygon, or an ellipse.

8. The electronic device according to claim 2,
wherein the plurality of first sub-transition layers are spaced apart along the outer periphery of the conductive plating layer on an outer edge of the conductive plating layer; and
wherein two adjacent first transition layers and a part of the outer edge of the conductive plating layer form a notch, so that the outer edge of the conductive plating layer is serrated.

9. The electronic device according to claim 8, wherein a shape of the first sub-transition layer is a semicircle or a polygon.

10. An electronic device, comprising:
a display device;
a middle frame; and
a battery cover,
wherein the display device and the battery cover are respectively located at two sides of the middle frame;
wherein the display device comprises at least a display layer and a mounting bracket, wherein the mounting bracket comprises a first surface and a second surface, the first surface faces the display layer, and the second surface faces the middle frame;
wherein a conductive plating layer is arranged on a partial region of the second surface of the mounting bracket, a plurality of openings are provided on the conductive plating layer, and hole bottoms of the openings extend to the second surface; and
wherein the conductive plating layer is electrically connected to the middle frame.

11. The electronic device according to claim 10, wherein the plurality of openings are spaced apart around a center of the conductive plating layer for one or more turns.

12. The electronic device according to claim 11, wherein each opening of the plurality of openings is a round hole, a square hole, or an elliptical hole.

13. An electronic device, comprising:
a display device;
a middle frame; and
a battery cover,
wherein the display device and the battery cover are respectively located at two sides of the middle frame;
wherein the display device comprises at least a display layer and a mounting bracket, wherein the mounting bracket comprises a first surface and a second surface, the first surface faces the display layer, and the second surface faces the middle frame;
wherein a recessed region is provided on the first surface of the mounting bracket, and a conductive plating layer is arranged at a position opposite to the recessed region on the second surface of the mounting bracket; and
wherein the conductive plating layer is electrically connected to the middle frame.

14. The electronic device according to claim 13, wherein an orthographic projection of the recessed region toward the conductive plating layer completely coincides with the conductive plating layer.

15. The electronic device according to claim 1, further comprising:
a conductive member, wherein an end of the conductive member is electrically connected to the conductive plating layer, and another end of the conductive member is electrically connected to a metal middle plate of the middle frame.

16. The electronic device according to claim 15, wherein the conductive member is a conductive elastomer or a conductive foam.

17. The electronic device according to claim 1, wherein the electronic device is a foldable device.

18. The electronic device according to claim 1, wherein the mounting bracket is a conductive mounting bracket made of metal alloy or stainless steel.

19. The electronic device according to claim 1, wherein a thickness of the conductive plating layer is less than or equal to 0.2 mm.

* * * * *